US006513101B1

(12) United States Patent
Fisher et al.

(10) Patent No.: US 6,513,101 B1
(45) Date of Patent: Jan. 28, 2003

(54) EXPIRING HOST SELECTED SCRATCH LOGICAL VOLUMES IN AN AUTOMATED DATA STORAGE LIBRARY

(75) Inventors: James Arthur Fisher, Tucson, AZ (US); Jonathan Wayne Peake, Tucson, AZ (US); Kerri Renee Shotwell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/477,557

(22) Filed: Jan. 4, 2000

(51) Int. Cl.[7] .................. G06F 17/30; G06F 12/12; G06F 13/16
(52) U.S. Cl. .................. 711/159; 711/209; 712/27; 707/8; 707/5
(58) Field of Search .................. 711/111, 202, 711/209, 4, 159; 707/8, 5; 712/27, 225, 228

(56) References Cited

U.S. PATENT DOCUMENTS 5,546,557 A * 8/1996 Allen et al. .................. 711/111
5,621,887 A 4/1997 Chatterji .................. 395/183.18
5,870,732 A * 2/1999 Fisher et al. .................. 707/8
5,926,834 A 7/1999 Carlson et al. .................. 711/152

* cited by examiner

Primary Examiner—Daniel H. Pan
(74) Attorney, Agent, or Firm—John H. Holcombe; Jean M. Barkley

(57) ABSTRACT

Disclosed are a data storage library and library computer processor implemented methods for expiring logical volumes in response to expiration selection from a host. A library server maintains a mapping database which identifies each logical volume and maps the logical volumes to data storage media. A library manager classifies the host selected expired logical volume in a category of logical volumes having a "SCRATCH" attribute, which may have an expiration delay, and identifies the selected logical volume in a searchable database as comprising the category having the "SCRATCH" attribute, and may calculate an expiration time for the selected logical volume from the delay. The library manager subsequently searches the searchable database for logical volumes identified as comprising a category having the "SCRATCH" attribute, and whose expiration time has passed, providing an indication to the library server that the searched identified logical volumes are expired. The library server then expires the identified logical volumes from the mapping database.

28 Claims, 5 Drawing Sheets

82

CATEGORY TABLE

| CATEGORY | ATTRIBUTE | ATTRIBUTE | ATTRIBUTE |
|---|---|---|---|
| 001 | SCRATCH | 176 HR. DELAY | |
| 002 | SCRATCH | 24 HR. DELAY | |
| 003 | SCRATCH | 2 HR. DELAY | |
| 004 | PRIVATE | – | |
| 005 | PRIVATE | – | |

83    84    85    86

MAPPING DATABASE

| LOGICAL VOLUME VOLSER | PHYSICAL VOLUME VOLSER | BEGINNING LOCATION ON PHYSICAL VOLUME | LENGTH | ACTIVE/ EXPIRED |
|---|---|---|---|---|
| 000053 | 1153A | – | – | E |
| 000091 | A0724 | – | – | A |
| 0001D2 | 12769 | – | – | A |

CARTRIDGE TABLE

| VOLSER | SHELF LOCATION X-Y | MEDIA TYPE | INDICATORS |
|---|---|---|---|
| 1153A | – | – | – |

CATEGORY TABLE

| CATEGORY | ATTRIBUTE | ATTRIBUTE | ATTRIBUTE |
|---|---|---|---|
| 001 | SCRATCH | 176 HR. DELAY | |
| 002 | SCRATCH | 24 HR. DELAY | |
| 003 | SCRATCH | 2 HR. DELAY | |
| 004 | PRIVATE | | – |
| 005 | PRIVATE | | – |

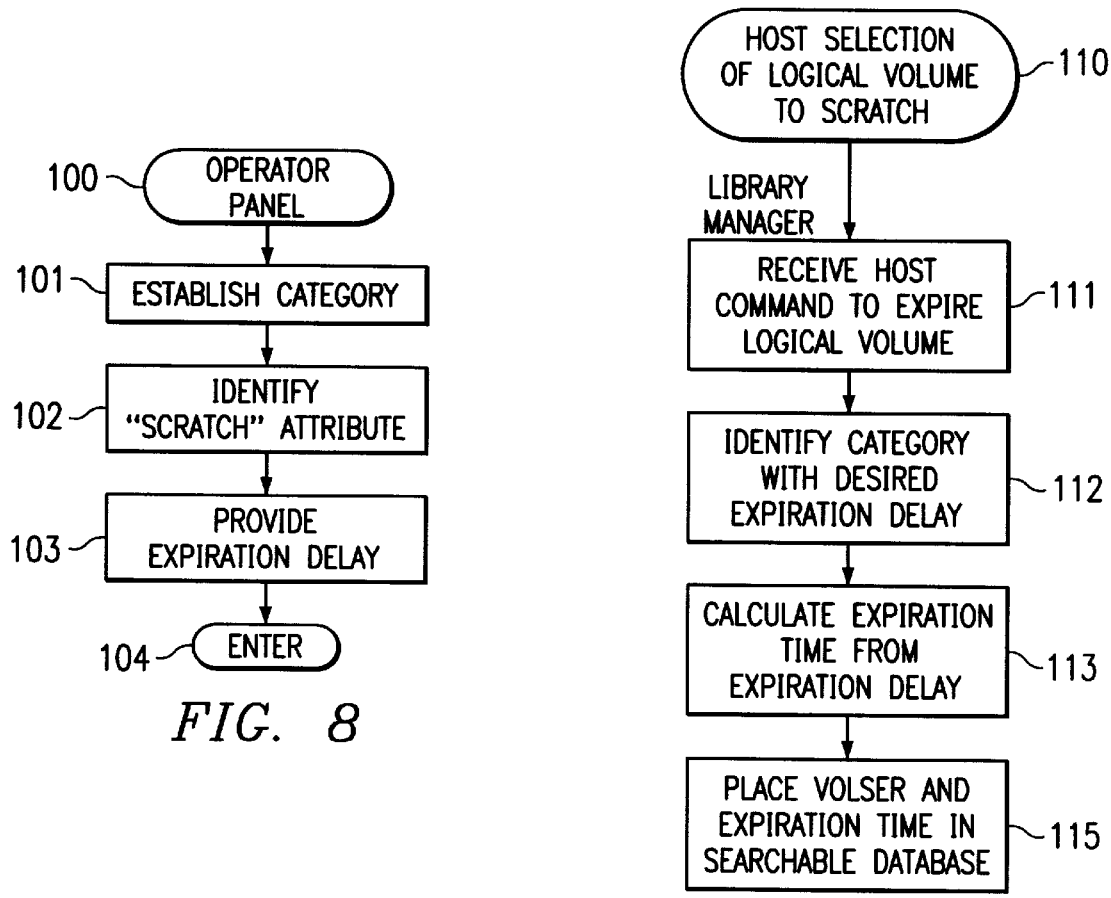

EXPIRING HOST SELECTED SCRATCH LOGICAL VOLUMES IN AN AUTOMATED DATA STORAGE LIBRARY

FIELD OF THE INVENTION

This invention relates to the management of logical volumes stacked in data storage media stored in an automated data storage library, and, more particularly, to the expiration of selected logical volumes.

BACKGROUND OF THE INVENTION

Automated data storage libraries are provided in data processing computer systems for storing vast quantities of data that may be retrieved in reasonable time. The data is typically stored on data storage media, such as magnetic tape in a tape cartridge or cassette, or an optical disk or cartridge. The capacity of such media is considerable, and is much greater than the average size of a data set for most application programs. Consequently, multiple logical volumes of data are "stacked" in a single data storage media or "physical volume". Commonly assigned U.S. Pat. No. 5,546,557 describes the creation and management of such logical volumes and the associated data storage media in an automated data storage library.

A mapping database is conventionally maintained by a library server which identifies each logical volume in the library and maps the logical volumes to the data storage media.

Cache storage is conventionally provided in automated data storage libraries to provide a quick access to data, for example, in a hard disk drive, without waiting for the data storage media to be accessed and loaded into a drive unit to be read and/or written. The data storage media, the storage shelves on which the media are stored, the accessor(s) for accessing the data storage media, and the drive units reading and/or writing data on the data storage media are called "backing storage".

Often, logical volumes recalled from backing storage data storage media are again accessed, and often updated, within a short period of time. Thus, by having the logical volumes in cache storage, they may be quickly accessed. Conventionally, the logical volumes are variable in length, so that an updated logical volume may be longer or shorter in length than the original. Hence, when an updated logical volume in cache storage is returned to the backing storage data storage media, or "migrated", it is typically not returned to the same location on the media, and often is written instead to a new or reclaimed data storage media.

A new data storage media, or physical volume, is called a "SCRATCH" physical volume, and the logical volumes will be defined as they are written, and identified and mapped to the data storage media by the library server in the mapping database. The original logical volumes that have been updated and rewritten elsewhere are no longer tracked by the library server in the mapping database.

On occasion, the library server will operate a library manager to reclaim a physical volume so that the physical volume becomes a "SCRATCH" volume. All of the non-expired logical volumes are read from the backing storage physical volume data storage media into cache storage and are rewritten onto another physical volume without updating, leaving the first physical volume as a "SCRATCH" volume which may be entirely rewritten.

Often, a host system will no longer need data. For example, the data is expired because of age or other reasons. The host system may identify the affected logical volumes as expired. However, the library server has no means to reflect this host-originated change in the server's mapping database. Thus, the library server continues to manage the logical volumes as active data. Since the host considers the data to be expired, the host will not recall and will not update the data. The data is therefore carried indefinitely in the mapping database as though it were active. The continued management of the expired logical volumes requires that each of the volumes must be saved and rewritten during any reclaim procedure. As the result, much of the processing time of the library server and library manager and much of the activity of the backing storage and of the cache storage in reclaiming the physical volumes will be wasted in saving the host-expired logical volumes.

The logical volumes that have been expired by the host system will therefore ultimately occupy a significant proportion of the physical volumes, so that much of the space of the data storage media of the backing store is also wasted in storing the host-expired logical volumes.

In a complicated and lengthy process, the entire contents of an automated data storage library may be inventoried in order to identify the host-expired logical volumes. The library must be placed offline and made unavailable for use during the inventory process. Commonly assigned U.S. Pat. No. 5,870,732 describes a method for creating a new inventory of the physical volumes of data storage media and of the logical volumes stored on the physical media. A host system may be able to ascertain that many of the logical volumes have been expired by the host. However, in a multiple host system, one host conducting the inventory may be unable to identify the logical volumes expired by another host.

As the result, the actual removal of the expired logical volumes from the library server mapping database is not certain and, if done, will be as the result of a complicated and lengthy process.

SUMMARY OF THE INVENTION

An object of the present invention is to provide removal of host-expired logical volumes by the automated data storage library without requiring an inventory of the entire library.

Disclosed are a data storage library and library computer processor implemented methods for expiring logical volumes in response to expiration selection from a host. A library server maintains the mapping database which identifies each logical volume and maps the logical volumes to the data storage media. The library server additionally manages the logical volumes of the mapping database, the managing comprising expiring logical volumes from the mapping database, e.g., by reclaiming the data storage media, rewriting only the logical volumes which appear as active in the mapping database.

An input receives commands from a host system relating to the logical volumes, one of the commands comprising expiration selection of at least one of the logical volumes. A category of logical volumes will have been established at an operator station, the categories listed in a category table by a library manager together with at least one attribute of each category. The operator established category has a "SCRATCH" attribute, and additionally an expiration delay may be established for the category having the "SCRATCH" attribute.

The library manager responds to the received host expiration selection of any of the logical volumes, classifying the selected logical volume in the category having the "SCRATCH" attribute in the category table, identifying the selected logical volume, in a searchable database, as comprising the category having the "SCRATCH" attribute. Additionally, the library manager may calculate from the expiration delay an expiration time for the selected logical volume.

The library manager subsequently searches the searchable database for logical volumes identified as comprising the category having the "SCRATCH" attribute, and whose expiration time has passed. The library manager provides an indication to the library server that the searched identified logical volumes are expired, and the library server then expires the searched identified logical volumes from the mapping database.

The delay time serves as a recovery window, during which time the host may revive any logical volume that had been selected for expiration. The library manager reclassifies the logical volume into a category other than a category having the "SCRATCH" attribute.

For a fuller understanding of the present invention, reference should be made to the following detailed description taken in conjunction with the accompanying drawings.

BRIEF DESCRIPTION OF THE DRAWINGS

FIG. 4 is a diagrammatic representation of a mapping database for the library of FIGS. 1 and 3;

FIG. 5 is a diagrammatic representation of a cartridge table for the library of FIGS. 1 and 3;

FIG. 6 is a diagrammatic representation of a category table employed in accordance with the present invention for the library of FIGS. 1 and 3;

FIG. 7 is a diagrammatic representation of a searchable database employed in accordance with the present invention for the library of FIGS. 1 and 3;

FIGS. 8–10 are flow charts depicting an embodiment the method of the present invention.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
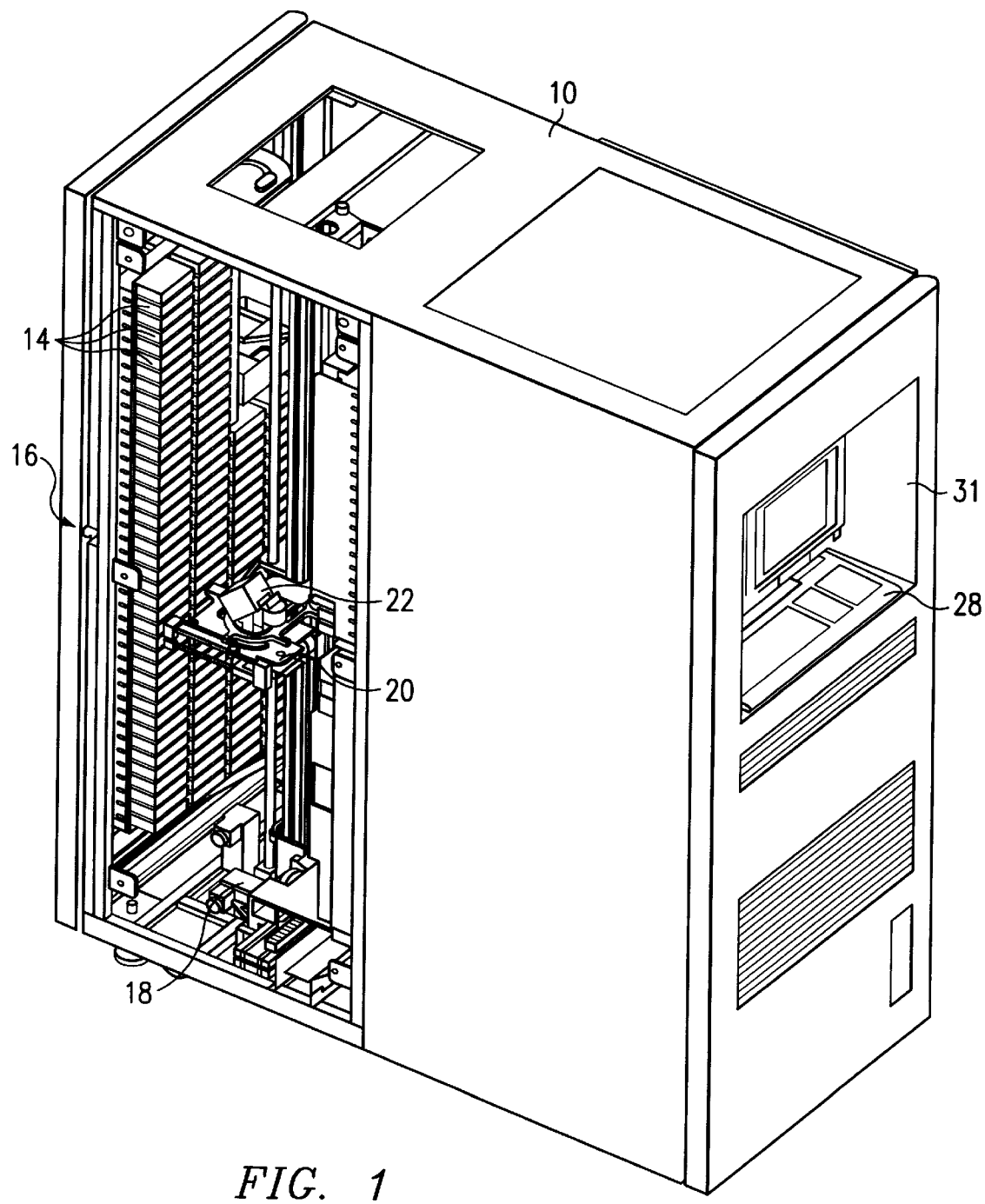
FIG. 1 is an isometric view of an automated data storage library which may implement the present invention.
Figure 3:
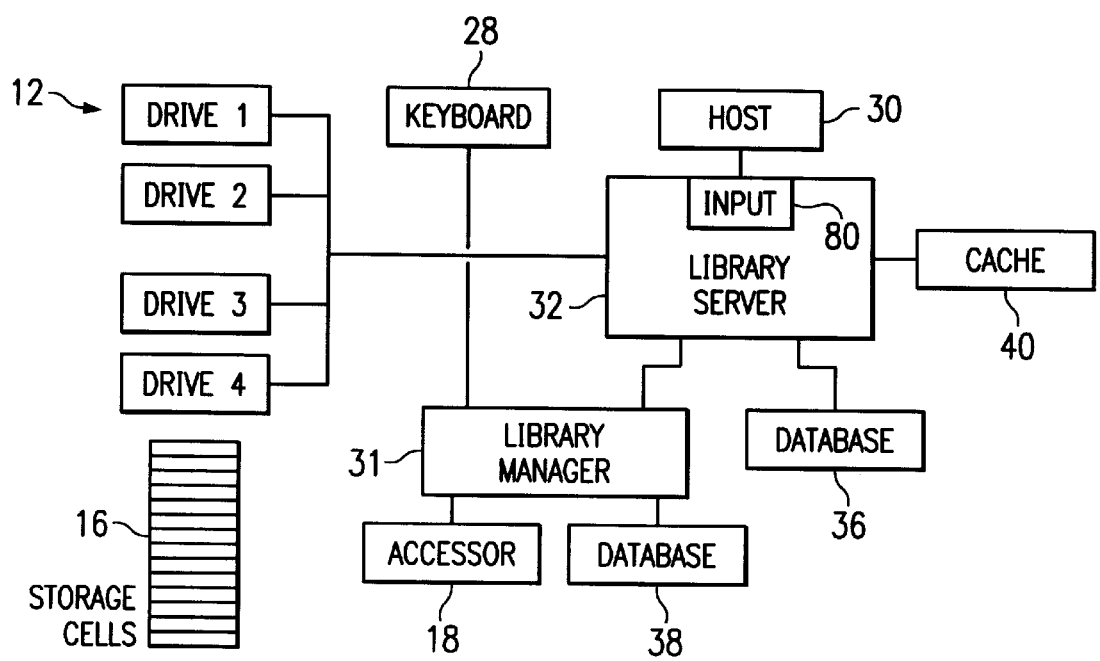
FIG. 3 is a block diagram of an embodiment of a library of FIG. 1.

FIGS. 1 and 3 illustrate an automated data storage library 10 which stores and retrieves data storage media having a plurality of logical volumes of data thereon. An example of a library which may implement the present invention is the IBM 3494 Tape Library Dataserver with attached Virtual Tape Server.

The library 10 includes one or more drive units 12, media cartridges 14 stored in storage shelves 16, an accessor 18, a library manager 31 and a library server 32. The accessor 18 includes a cartridge gripper 20 and a bar code scanner 22 or similar vision system, mounted on the gripper 20, to "read" identifying labels on the cartridges 14. The drive units 12 can be optical disk drives or magnetic tape drives, and the cartridges can contain optical or magnetic media, respectively, or any other removable media and associated drives. The library manager 31 is interconnected with, and controls the actions of, the accessor 18. The library manager is also provided with a keyboard 28.

Figure 2:
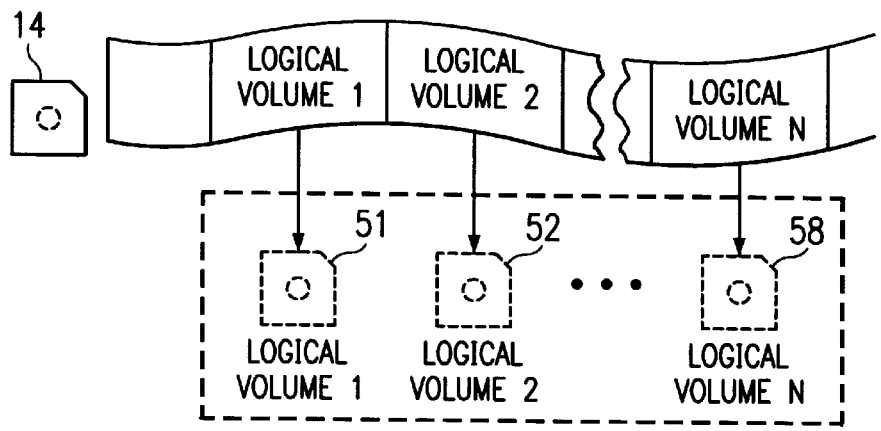
FIG. 2 is a generalized diagram of logical volumes stored on a single physical volume data storage media of FIG. 1.

FIG. 2 represents a physical media volume 14, such a magnetic tape in a cartridge, or an optical disk, which contains N stacked logical volumes 51 through 58. In one configuration, a single physical volume can include up to 140 logical volumes of 50 MB each, each of which can be individually addressed and accessed. In another configuration, a single physical volume can include a variable number of logical volumes of variable sizes, each of which can be individually addressed and accessed.

The library manager 31 and library server 32 may comprise one or more computer processors. One example of a suitable programmable computer processor is an IBM RS-6000 processor. The computer processors are provided with operating systems and with application programs for operating in accordance with the present invention. The application programs may comprise a computer program product, comprising computer readable program code. The computer program product may be supplied electronically, as from a network or a host 30. Alternatively, the computer program product may be supplied at an I/O station of the processor or from a storage media which stores executable computer instructions, and comprises an article of manufacture, such as data storage media 14 in FIG. 2. Another example of a storage media which is an article of manufacture is a magnetic diskette. Other suitable storage media are optical disk cartridges, magnetic tape cartridges, removable hard disk cartridges, read only memories (ROM) or programmable read only memories (PROM). The requirement for the storage media or memories is that they store digital representations of computer executable instructions. The operating system and application programs may be stored in the database storage 36 for library server 32 and database storage 38 of the library manager 31.

The library server 32 provides a mapping database which identifies each logical volume and maps the logical volumes to the data storage media physical volumes. The library server additionally manages the logical volumes of the mapping database, the managing comprising expiring logical volumes from the mapping database, e.g., by reclaiming the data storage media, rewriting only the logical volumes which appear as active in the mapping database. The library server may comprise a virtual library server which provides a non-volatile cache storage 40, such as a disk drive or an electronic memory. The cache storage is accessible at a relatively fast electronic, or near electronic speed, while the data storage media 14 are accessible at much slower mechanical speeds. However, the cache capacity is very limited as compared to the capacity of the entire library of data storage media 14. When a logical volume is accessed, it is likely to be reaccessed a short length of time later, either to use some additional data in the logical volume, or to update the logical volume. Thus, a logical volume is typically maintained in cache 40 for a short period of time after it is accessed, and then is "migrated" from cache to a physical volume data storage media 14. Typically, the library server 32 will build up a full physical volume of logical volumes and write the full volume at once.

The key identifier for both logical volumes and physical volumes is the "Volume Serial Number" or "VOLSER", comprising a predetermined number of characters or blanks. Most physical volumes have the VOLSER, or a similar identifier which is translatable to a VOLSER, encoded in a label which is on the side of the data storage media (cartridge) 14 which is readable by the library accessor 18.

The library server 32 maintains a mapping database in storage 36 and identifies each logical volume and maps the logical volumes to the data storage media. An example of a mapping database is illustrated as database 60 in FIG. 4, as will be explained. The library server also maintains the cache 40 and manages the access by the host to the logical volumes in cache 40 and the logical volumes located on physical volumes. The library server additionally provides commands from the host to the library manager 31 and reads the data accessed by the library manager from the drive units 12.

The library manager 31 operates the library, including the accessor 18, in response to commands from the host and library server. The library manager has database in storage 38, illustrated as database 62 in FIG. 5, as will be explained, which provides a cartridge table relating the physical volume VOLSERs to the storage shelves 16 containing the data storage media 14, typically by providing the X-Y coordinates of the storage shelf. Thus, the library manager operates the accessor to transport the media 14 between the storage shelves 16 and the drive units 12.

Conventionally, the logical volumes are variable in length, so that an updated logical volume may be longer or shorter in length than the original. Hence, when an updated logical volume in cache storage 40 is returned to a data storage media, or "migrated", it is typically not returned to the same location on the media, and often is written instead to a new or reclaimed data storage media.

A new data storage media, or physical volume, is called a "SCRATCH" physical volume, and the logical volumes will be defined as they are written, and identified and mapped to the data storage media by the library server in the mapping database. The original logical volumes that have been updated and rewritten elsewhere are no longer tracked by the library server 32 in the mapping database 60.

On occasion, the library server 32 will operate a library manager 31 to reclaim a physical volume having some active and some expired logical volumes so that the physical volume becomes a "SCRATCH" volume. All of the active logical volumes are read from the physical volume data storage media 14 into cache storage 40 and are rewritten onto another physical volume without updating, leaving the first physical volume as a "SCRATCH" volume which may be entirely rewritten.

Often, a host system 30 will no longer need data. For example, the data is expired because of age or other reasons. The host system may identify the affected logical volumes as expired. However, the library server 32 has no means to reflect this host-originated change in the mapping database 60. Thus, the library server 32 continues to manage the logical volumes as active data. Since the host 30 considers the data to be expired, the host will not recall and will not update the data. The data is therefore carried as though it were active indefinitely. The continued management of the expired logical volumes requires that each of the volumes must be saved and rewritten during any reclaim procedure. As the result, much of the processing time of the library server and library manager and much of the activity of the library in reclaiming the physical volumes will be wasted in saving the host-expired logical volumes.

The logical volumes that have been expired by the host system will therefore ultimately occupy a significant portion of the physical volumes, so that much of the space of the data storage media 14 and of the storage shelves 16 is also wasted in storing the host-expired logical volumes.

One way of saving the wasted space is to inventory, in a complicated and lengthy process, the entire contents of the library. As discussed above, the library must be placed offline and made unavailable for use during the inventory process.

The present invention provides expiration of logical volumes that have been designated as scratch by a host without requiring an inventory of the entire library.

Referring to FIGS. 1 and 3, the library server 32 maintains the mapping database 60 of FIG. 4 in storage 36 which identifies each logical volume and maps the logical volumes to the data storage media. The library server 32 additionally manages the logical volumes of the mapping database, the managing comprising expiring logical volumes from the mapping database, e.g., by reclaiming the data storage media, rewriting only the logical volumes which appear as active in the mapping database.

An example of a mapping database 60 is illustrated in FIG. 4. The mapping database is maintained by the library server 32 and relates the logical volumes to the physical volumes, or data storage media, on which they are recorded. Conventionally, the logical volumes are identified in the database by their VOLSERs, e.g., in column 65. Each logical volume is recorded on a data storage media 14, whose physical volume VOLSER is identified in column 66. The location of the logical volume on the data storage media is identified in the database by giving its beginning location in column 67, and, if the logical volumes are variable in length, the length is provided in column 68.

An example of a cartridge table 62 is illustrated in FIG. 5. The cartridge table provides information regarding the location of all of the physical volumes of the library. As will be discussed, the cartridge table 62 may also comprise a searchable database describing the status of all the logical and physical volumes. Conventionally, the first column 70 in the table is the VOLSER as described above. The second column 71 is the shelf location of a physical volume, typically in X-Y coordinates. Column 72 may indicate whether the volume is a logical or a physical volume, and the type of media, for example, indicating the length or capacity of the media. Column 73 may comprise indicators, which identify various situations of a volume. For example, a volume may be "mounted" in a drive unit 12.

The host system 30 designates desired logical volumes as "SCRATCH" so as to expire the logical volumes. As discussed above, a host system 30 will no longer need data and expire a logical volume, for example, because of age or other reasons.

Commands from the host system are received at an input 80, for example, of the library server 32. One of the commands may comprise expiration selection of at least one of the logical volumes.

In accordance with the present invention, the host-expiration command is forwarded to the library manager 31. The library manager classifies the logical volumes within categories of logical volumes, the categories listed in a category table together with at least one attribute of each the category. Category tables are defined in the '557 patent, and an example is illustrated as category table 82 in FIG. 6. A category is an identified group of volumes having a common attribute. Examples of categories are a particular user of the volume, a particular type of job or set of jobs which utilize the volume to which each of the volumes of the assigned.

The categories are identified in column 83 of table 82, and the attribute or attributes of the category are listed in columns 84–86. Categories that are related to users or jobs are typically called "PRIVATE" categories, such as categories "004" and "005" in table 82.

A category of volumes will have been established at the operator station 28 in accordance with the present invention as having a "SCRATCH" attribute, such as category "001" in table 82. Additionally, an expiration delay may be established for the category having the "SCRATCH" attribute. The expiration delay is the minimum period of time subsequent to initiation of the expiration of a logical volume, that the expiration is allowed to occur. This delay period provides a recovery window, during which a user or host system may realize that the logical volume should not have been expired, and to then recover that logical volume. As examples, category "001" may have a 176 hour delay, or one week and eight hours; category "002" may have a one day, or 24 hour, delay; and category "003" may have only a 2 hour delay.

In accordance with the present invention, the library manager 31 responds to the received host-expiration selection of any of the logical volumes, classifying the selected logical volume in one of the categories having the "SCRATCH" attribute in the category table 82. The host system 30 will select the "SCRATCH" attribute and the desired delay by requesting the classification to the desired category.

The library manager identifies the selected logical volume in a searchable database, such as database 90 in FIG. 7, as comprising the category having the "SCRATCH" attribute. The searchable database 90 may be incorporated in the cartridge table 62 of FIG. 5. The library manager identifies the logical volume by its VOLSER in column 91. The category may be identified in column 92, and the attributes are available from the category table 82.

Additionally, the library manager 31 may calculate an expiration time for the selected logical volume from the expiration delay 85 in table 82. The expiration time comprises the addition of the expiration delay to the present time, which may comprise the time of the host command, or the time that the library manager identifies the logical volume in the searchable database 90 and the expiration time may be stored in column 94.

As discussed above, the delay time until the expiration time of column 94 expires serves as a recovery window, during which time the host may revive any logical volume that had been selected for expiration. The host will provide a command to reclassify the logical volume, and the library manager 31 reclassifies the logical volume into a category other than a category having the "SCRATCH" attribute.

The library manager 31 subsequently searches the searchable database 90 for logical volumes identified as comprising the category having the "SCRATCH" attribute, and whose expiration time has passed. The library manager provides an indication to the library server 32 that the searched identified logical volumes are expired. The library server then expires the searched identified logical volumes from the mapping database 60, either by deleting the logical volume from the database, or by indicating in column 69 that the logical volume is expired. Then, when the library server reclaims data storage media, the logical volume that was expired is not reclaimed, and its data is therefore deleted from the library.

Figure 10:
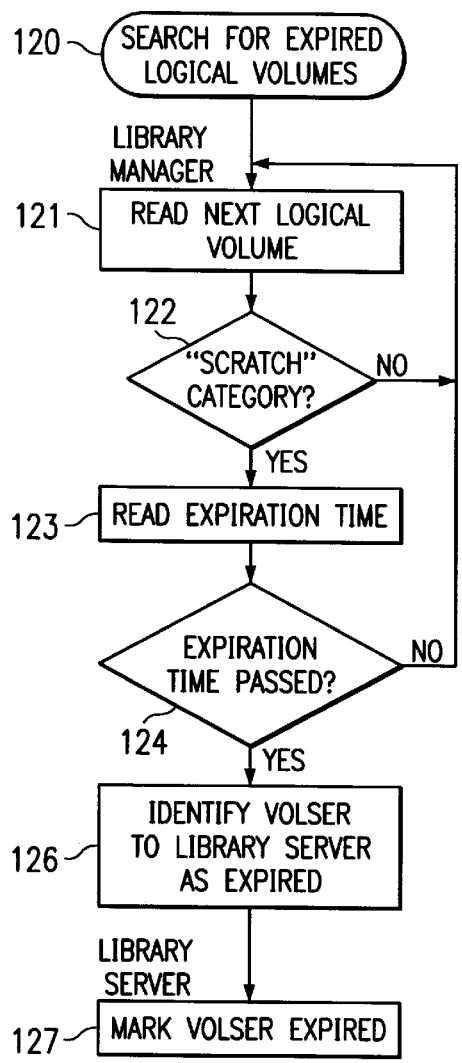

A computer-implemented embodiment of the present invention is illustrated in FIGS. 8–10. Referring to FIGS. 1, 3, 5, 6 and 8, the library system operator, at step 100, brings up an operator panel at the operator station 28. In step 101, the operator establishes a category for table 82, and, in step 102, identifies the category as having a "SCRATCH" attribute. Then, in step 103, the operator will set the delay time for the established category. Upon completing the panel, the library manager will associate the delay time with the specified category in the category table 82 in step 104. Thus, the category table 82 will identify the category in column 83, its "SCRATCH" attribute in column 84, and the delay time in column 85.

Referring additionally to FIGS. 7 and 9, the host 30, in step 110, selects a logical volume to be expired and become scratch in a command at input 80, and the library server forwards the command to the library manager. The host may select the logical volume to be expired by a command to classify the logical volume in one of the categories having a "SCRATCH" attribute and the desired delay time. In step 111, library manager 31 receives the host command to expire the selected logical volume. The library manager responds to the received host command in step 112, identifying the category with the desired delay time as designated by the host command from category table 82, thereby classifying the logical volume in a "SCRATCH" category. In step 113, the library manager calculates the expiration time form the expiration delay of column 85 in table 82. As discussed above, the calculation is from the present time, adding the expiration delay. In step 115, the library manager enters the VOLSER and expiration time in the searchable database 90, which may comprise the cartridge table 62. The database 90 identifies the logical volume in column 91, and provides the expiration time in column 94. Those of skill in the art understand that the expiration time may comprise various alternative designations, such as including date, hour, minute and second, or as comprising the time since a particular event. Those of skill in the art will also recognize that the category table 82 and the searchable database 90 may be arranged in many different ways.

Referring additionally to FIGS. 4 and 10, the library manager 31, beginning at step 120, searches the searchable database 90 for expired logical volumes. In step 121, the library manager reads the next logical volume entry in the database 90. As is understood by those of skill in the art, the search may be sequential by VOLSER or may employ any suitable search algorithm. In step 122, the library manager determines whether the logical volume is a "SCRATCH" category. If not, the next volume is read in step 121. The determination is made either by checking the category of column 92 with the category 82, or detecting an entry in column 94. If the logical volume of the entry is "SCRATCH", the library manager reads the expiration 20 time from column 94 in table 90 in step 123, and, in step 124, the library manager determines whether the expiration time has passed. The determination of step 124 may comprise determining whether the present time is greater than the expiration time.

If the expiration time has not passed, the logical volume is still in the recovery window, and the host may still request that the logical volume be reclassified into a valid category which is not a "SCRATCH" category. Hence, the library manager cycles back to step 121 to read the next logical volume entry.

If the expiration time has passed, the logical volume is to be expired. The library manager 31, in step 126, identifies the logical volume VOLSER as expired to the library server 32.

In the example of mapping database 60, the library server 32, in step 127, marks the VOLSER for the logical volume as expired in column 69. As discussed above, the library server may alternatively delete the entry for the logical volume from the database 60. The logical volume has therefore been deleted from the mapping database.

Figure 11:
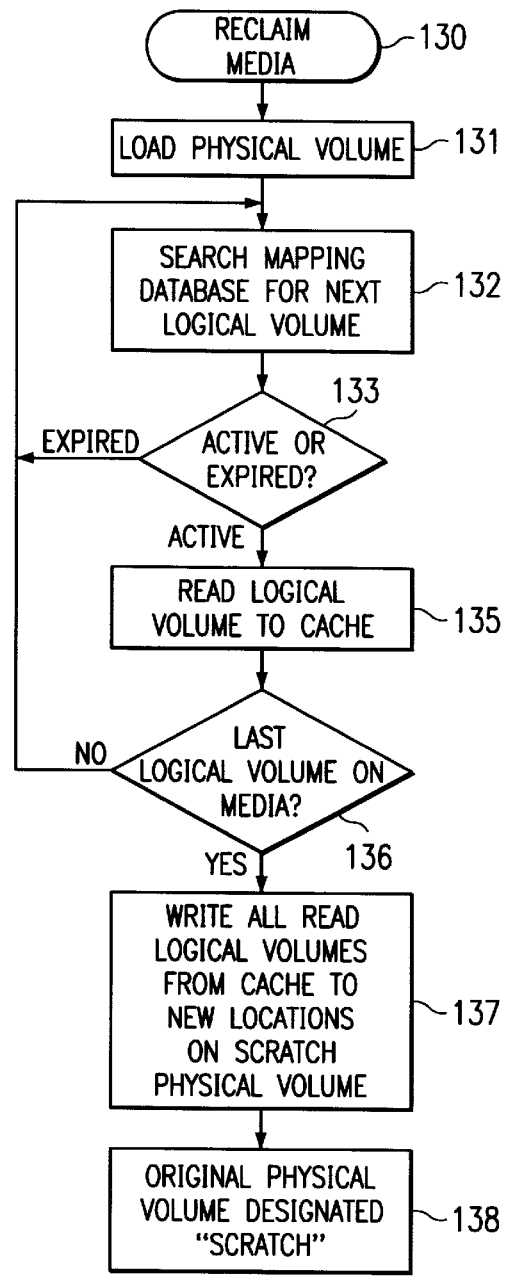
FIG. 11 is a flow chart depicting a method for reclaiming data storage media by the library of FIGS. 1 and 3.

FIG. 11 illustrates one aspect of the management of the logical volumes by the library server, comprising the reclaim procedure, discussed above. The expired logical volume will be ignored in future management by the library server 32. The reclaim procedure for a physical volume data storage media, begins at step 130. Those of skill in the art will understand that many reclaim procedures may be utilized. In the procedure illustrated in FIG. 11, the library server operates the library manager to, in step 131, load the physical volume media to be reclaimed in a drive unit 12. In step 132, the library server 32 searches the mapping database 60 for the next logical volume entry for the physical media loaded in the drive unit. In step 133, the library server determines from the entry whether the logical volume is active or expired. If the logical volume is expired, it will be allowed to be deleted by ignoring the logical volume. Alternatively, if the expired logical volume was deleted from the mapping database 60 when expired, step 133 is unnecessary.

If the logical volume entry indicates that the logical volume is valid and active, the library server, in step 135, operates the drive unit 12 to read the logical volume into cache storage 40.

At step 136, the library server determines whether the entry of the physical volume in the mapping database was the last logical volume on the physical volume data storage media. If not, "NO" in step 136, the process cycles back to step 132 to search for the next entry relating to a logical volume for the media.

If all the active logical volumes have been read from the media to cache 40, "YES" in step 136, all the logical volumes read into cache in step 135 are written in step 137 from cache 40 to new locations on a scratch physical volume. Then, in step 138, the original physical volume from which all of the active logical volumes have been read and transferred to a scratch volume, is designated as "SCRATCH". Thus, the physical volume has been reclaimed.

In accordance with the present invention, the host expired logical volumes have been expired and deleted from the reclaimed physical volumes, and are no longer carried as though they were active logical volumes. The host expired logical volumes are ignored during management of the library through the management database such that the expired logical volumes are not saved and rewritten during any reclaim procedure. As the result, much of the processing time of the library server and library manager and much of the activity of the backing storage and of the cache storage in reclaiming the physical volumes are saved by not managing the host-expired logical volumes.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a data storage library for storing a plurality of data storage media, said media each capable of storing a stacked plurality of logical volumes of data, said logical volumes identified by VOLSERs, said logical volumes separable into identifiable categories of logical volumes, said library mapping said logical volumes to said data storage media in a mapping database, a method for expiring said logical volumes in response to expiration selection from a host, comprising the steps of:

establishing at least one said category of said logical volumes as having a "SCRATCH" attribute;

responding to said host expiration selection of any of said logical volumes, identifying said selected logical volume VOLSER in a searchable database as comprising said category having said "SCRATCH" attribute;

subsequently searching said searchable database for logical volume VOLSERs identified as comprising said category having said "SCRATCH" attribute; and expiring said logical volumes having said searched identified VOLSERs from said mapping database.

2. The method of claim 1, wherein said establishing step additionally comprises establishing an expiration delay for said category having said "SCRATCH" attribute, wherein said identifying step additionally comprises calculating from said expiration delay an expiration time for said selected logical volume, and wherein said searching step comprises searching for said logical volume VOLSERs identified as comprising said category having said "SCRATCH" attribute whose expiration time has passed.

3. The method of claim 2, wherein said identifying step expiration time calculated from said expiration delay comprises a recovery window, and wherein said method additionally comprises the step of responding to a host command to revive any said selected logical volume to be expired, during said recovery window for said selected logical volume, reclassifying said selected logical volume to a category other than a category having said "SCRATCH" attribute, thereby reviving said reclassified selected logical volume.

4. The method of claim 2, additionally comprising the step of maintaining said selected VOLSERs in said mapping database as active until expired in said expiring step.

5. The method of claim 1, wherein said data storage library comprises a library manager and a library server, said library manager maintaining said searchable database and conducting said identifying and said searching steps, and said library server maintaining said mapping database and conducting said expiring step, said library server additionally conducting the steps of managing said logical volumes of said mapping database, and discontinuing said managing of any said logical volume expired in said expiring step, thereby deleting said expired logical volume.

6. The method of claim 5, wherein said expiring step additionally comprises marking said searched identified logical volume VOLSERs as expired volumes in said mapping database, indicating to said library server to discontinue said managing of said logical volumes.

7. The method of claim 1, wherein said library recalls logical volumes to be rewritten in response to commands from said host, said library storing said rewritten logical volumes at new locations, said recalled logical volume expired by said library by marking said logical volume as expired in said mapping database, said library ignoring any data stored in said marked library expired logical volumes, wherein said establishing step "SCRATCH" attribute comprises applying said expired mark as an attribute as applied to said host expiration selected logical volumes, whereby said host expiration selected logical volumes are marked as expired in said expiration step, said library subsequently ignoring any data in said marked host expired logical volumes.

8. The method of claim 7, for additionally reclaiming said data storage media, comprising the additional steps of:

determining from said mapping database all said logical volumes of at least one of said data storage media that remain active and unexpired, and rewriting only said active and unexpired logical volumes on another said data storage media, ignoring all said logical volumes marked as expired, thereby deleting said expired logical volumes.

9. A method for expiring logical volumes of data in response to expiration selection at an input, said logical volumes stacked in data storage media, said logical volumes each identified in a mapping database, said logical volumes classifiable as within categories of logical volumes, said categories listed in a category table together with at least one attribute of each said category, comprising the steps of:

responding to said expiration selection at said input of any of said logical volumes, classifying said selected logical volume in one of said categories, said one category having a "SCRATCH" attribute in said category table;

responding to said category classification, identifying said selected logical volume in a searchable database as having said "SCRATCH" attribute;

subsequently searching said searchable database for said identified "SCRATCH" attribute logical volumes; and expiring said searched identified logical volumes from said mapping database.

10. The method of claim 9, wherein said "SCRATCH" attribute of said one category additionally comprises an expiration delay, wherein said identifying step additionally comprises calculating from said expiration delay an expiration time for said selected logical volume, and wherein said searching step comprises searching said searchable database for said identified "SCRATCH" attribute logical volumes whose expiration time has passed.

11. The method of claim 10, wherein said identifying step expiration time calculated from said expiration delay comprises a recovery window, and wherein said method additionally comprises the step of responding to a revival command at said input directed to revive any said logical volume selected to be expired, during said recovery window for said selected logical volume, reclassifying said selected logical volume to a category other than a category having said "SCRATCH" attribute, thereby reviving said reclassified selected logical volume.

12. The method of claim 10, additionally comprising the step of maintaining said selected logical volume identifiers in said mapping database as active until expired in said expiring step.

13. The method of claim 9, wherein said expiring step additionally comprises marking said searched identified logical volumes as expired volumes, and comprising the additional step of managing only active and unexpired logical volumes of said mapping database, discontinuing said managing of said logical volumes marked as expired.

14. The method of claim 13, wherein said managing step comprises reclaiming said data storage media, comprising the steps of: determining from said mapping database all said logical volumes of at least one of said data storage media that remain active and unexpired, and rewriting only said active and unexpired logical volumes on another said data storage media, ignoring all said logical volumes marked as expired, thereby deleting said expired logical volumes.

15. An automated data storage library, comprising:

a backing storage for storing a plurality of data storage media, said media each capable of storing a stacked plurality of logical volumes of data, said backing storage having at least one accessor and at least one drive unit for accessing and reading and/or writing said logical volumes of said data storage media;

a cache storage for storing a plurality of said logical volumes of data, said cache storage accessing and reading and/or writing said logical volumes at a higher speed than said backing storage;

a library server maintaining a mapping database, said mapping database identifying each said logical volume and mapping said logical volumes to said data storage media, said library server additionally managing said logical volumes of said mapping database, said managing comprising expiring logical volumes from said mapping database;

an input receiving commands relating to said logical volumes, one of said commands comprising expiration selection of at least one of said logical volumes; and a library manager classifying said logical volumes within categories of logical volumes, said categories listed in a category table together with at least one attribute of each said category; said library manager responding to said received expiration selection of any of said logical volumes, classifying said selected logical volume in one of said categories, said one category having a "SCRATCH" attribute in said category table; said library manager identifying said selected logical volume in a searchable database as comprising said category having said "SCRATCH" attribute; said library manager subsequently searching said searchable database for logical volumes identified as comprising said category having said "SCRATCH" attribute; and said library manager indicating to said library server that said searched identified logical volumes are to be expired, said library server thereby expiring said searched identified logical volumes from said mapping database.

16. The automated data storage library of claim 15, additionally comprising an operator panel for establishing said at least one category having said "SCRATCH" attribute and additionally establishing an expiration delay for said category having said "SCRATCH" attribute, wherein said library manager identifying step additionally comprises calculating from said expiration delay an expiration time for said selected logical volume, and wherein said library manager searching step comprises searching for said logical volumes identified as comprising said category having said "SCRATCH" attribute whose expiration time has passed.

17. The automated data storage library of claim 16, wherein said library manager identifying step expiration time calculated from said expiration delay comprises a recovery window; wherein another of said commands received at said input relating to said logical volumes comprises a command to revive a selected logical volume; and wherein said library manager additionally responds to said revival command for any said selected logical volume to be expired, during said recovery window, reclassifying said selected logical volume to a category other than a category having said "SCRATCH" attribute, thereby reviving said reclassified selected logical volume.

18. The automated data storage library of claim 16, wherein said library server additionally maintains said selected logical volumes identified in said mapping database as active until expiring said searched identified logical volumes from said mapping database.

19. The automated data storage library of claim 15, wherein said library server management of said logical volumes identified in said mapping database additionally comprises maintaining said logical volumes and discontinuing said maintenance of any said logical volume upon expiring said searched identified logical volumes from said mapping database, thereby deleting said expired logical volume.

20. The automated data storage library of claim 19, wherein said library server expiring said searched identified logical volumes from said mapping database additionally comprises marking said searched identified logical volumes as expired volumes in said mapping database, indicating said discontinuance of said maintenance of said logical volumes.

21. The automated data storage library of claim 15, wherein said library server and said library manager recall logical volumes to be rewritten in response to commands received at said input, storing said rewritten logical volumes at new locations of said backing storage, said library server expiring said recalled logical volume by marking said logical volume as expired in said mapping database, said library server ignoring any data stored in said marked library expired logical volumes; and wherein said library manager classification of said "SCRATCH" attribute category of logical volumes comprises applying said expired mark as an attribute as applied to said input expiration selected logical volumes, whereby said input expiration selected logical volumes are marked as expired by said library server in said expiration step, said library server subsequently ignoring any data in said marked host expired logical volumes.

22. The automated data storage library of claim 21, for additionally reclaiming said data storage media, comprising the additional steps of: said library server determining from said mapping database all said logical volumes of at least one of said data storage media that remain active and unexpired, and said library server employing said library manager to rewrite only said active and unexpired logical volumes on another said data storage media, ignoring all said logical volumes marked as expired, thereby deleting said expired logical volumes.

23. A computer program product for expiring logical volumes of data in an automated data storage library in response to expiration selection at an input, said logical volumes stacked in data storage media, said automated data storage library having at least one computer processor, said at least one computer processor comprising a library manager and a library server, said library server maintaining a mapping database identifying each of said logical volumes and mapping said logical volumes to said data storage media, said logical volumes classifiable as within categories of logical volumes, said categories listed by said library manager in a category table together with at least one attribute of each said category, said computer program product comprising:

computer readable program code for causing said library manager to respond to said expiration selection at said input of any of said logical volumes, classifying said selected logical volume in one of said categories, said one category having a "SCRATCH" attribute in said category table;

computer readable program code for causing said library manager to respond to said category classification, identifying said selected logical volume in a searchable database as having said "SCRATCH" attribute;

computer readable program code for causing said library manager to subsequently search said searchable database for said identified "SCRATCH" attribute logical volumes; and computer readable program code for causing said library server to expire said searched identified logical volumes from said mapping database.

24. The computer program product of claim 23, wherein said computer readable program code additionally causes said library manager to provide in said "SCRATCH" attribute of said one category, an expiration delay; causes said library manager to, in said identifying step, additionally calculate from said expiration delay, an expiration time for said selected logical volume; and causes said library manager to, in said searching step, search said searchable database for said identified "SCRATCH" attribute logical volumes whose expiration time has passed.

25. The computer program product of claim 24, wherein said library manager calculated expiration time comprises a recovery window, and wherein said computer readable program code additionally causes said library manager to respond to a revival command at said input directed to revive any said logical volume selected to be expired, during said recovery window for said selected logical volume, said library manager reclassifying said selected logical volume to a category other than a category having said "SCRATCH" attribute, thereby reviving said reclassified selected logical volume.

26. The computer program product of claim 24, wherein said computer readable program code additionally causes said library server to maintain said selected logical volume identifiers in said mapping database as active until expired in said expiring step.

27. The computer program product of claim 23, wherein said computer readable program code additionally causes said library server to mark said searched identified logical volumes as expired volumes; and wherein said library server manages only active and unexpired logical volumes of said mapping database, discontinuing said managing of said logical volumes marked as expired.

28. The computer program product of claim 27, wherein said library server additionally reclaims said data storage media, said library server determining from said mapping database all said logical volumes of at least one of said data storage media that remain active and unexpired, and said library server employing said library manager to rewrite only said active and unexpired logical volumes on another said data storage media, ignoring all said logical volumes marked as expired, thereby deleting said expired logical volumes.

* * * * *